United States Patent
Yamamoto

[19]

[11] Patent Number: 5,843,288
[45] Date of Patent: Dec. 1, 1998

[54] METHODS AND APPARATUS FOR CONTROLLING TOXIC COMPOUNDS USING CATALYSIS-ASSISTED NON-THERMAL PLASMA

[76] Inventor: Toshiaki Yamamoto, 3212 Whitfield Rd., Chapel Hill, N.C. 27514

[21] Appl. No.: 764,316

[22] Filed: Dec. 12, 1996

Related U.S. Application Data

[62] Division of Ser. No. 533,932, Sep. 26, 1995, Pat. No. 5,609,736.

[51] Int. Cl.$^6$ ........................................... H05F 3/00
[52] U.S. Cl. ........................ 204/164; 588/210; 588/212; 588/227
[58] Field of Search ............................ 204/164; 588/210, 588/212, 227

[56] References Cited

U.S. PATENT DOCUMENTS

| | | | |
|---|---|---|---|
| 3,983,021 | 9/1976 | Henis | 204/164 |
| 4,541,848 | 9/1985 | Masuda | 55/139 |
| 4,665,476 | 5/1987 | Masuda | 363/86 |
| 4,954,320 | 9/1990 | Birmingham et al. | 422/186.04 |
| 4,966,611 | 10/1990 | Schumacher et al. | 55/20 |
| 5,163,829 | 11/1992 | Wildenberg | 431/5 |
| 5,176,897 | 1/1993 | Lester | 423/659 |
| 5,190,668 | 3/1993 | Chuang | 210/750 |
| 5,198,001 | 3/1993 | Knebel et al. | 55/28 |
| 5,236,672 | 8/1993 | Nunez et al. | 422/186.04 |
| 5,254,231 | 10/1993 | Heath et al. | 204/164 |
| 5,292,704 | 3/1994 | Lester | 502/309 |
| 5,362,405 | 11/1994 | Birbara et al. | 210/763 |
| 5,439,568 | 8/1995 | Uchiyama | 204/164 |

FOREIGN PATENT DOCUMENTS

| | | |
|---|---|---|
| 06091138A | 4/1990 | Japan . |
| 3275119 | 12/1991 | Japan . |

OTHER PUBLICATIONS

Yamamoto et al.; Catalysis–Assisted Plasma Technology for Carbon Tetrachloride Destruction; *1994 IEEE–IAS Annual Meeting*; pp. 1556–1562 (Oct. 3–6 1994).

*Primary Examiner*—Kathryn L. Gorgos
*Assistant Examiner*—Kishor Mayekar
*Attorney, Agent, or Firm*—Myers Bigel Sibley & Sajovec, P.A.

[57] ABSTRACT

The present invention provides methods and apparatus for decomposing toxic compounds so that reaction by-products produced thereby are selectively reduced. A method generally comprises: introducing a carrier gas, having a toxic compound entrained therein, into a packed-bed of ferroelectric pellets; and polarizing the pellets to produce a plasma which decomposes the toxic compound. The pellets are coated with a catalyst selected to react with by-products of the decomposition of the toxic compound and thereby produce non-toxic compounds. An apparatus for decomposing toxic compounds and selectively reducing by-products, according to the present invention, comprises: a vessel having an internal passageway therethrough; a packed-bed of pellets coated with at least one catalyst; means for producing a plasma within the packed-bed of pellets; and carrier gas flow means in fluid communication with the internal passageway for causing a carrier gas entrained with toxic compounds to flow through the packed-bed of pellets. The present invention also discloses methods and apparatus wherein a pulsed corona reactor having a catalyst coating on a portion thereof is utilized to decompose toxic compounds.

9 Claims, 6 Drawing Sheets

FIG. 7

METHODS AND APPARATUS FOR CONTROLLING TOXIC COMPOUNDS USING CATALYSIS-ASSISTED NON-THERMAL PLASMA

This application is a divisional of application Ser. No. 08/533,932, filed 26 Sep. 1995 now U.S. Pat. No. 5,609,736.

FIELD OF THE INVENTION

The present invention relates generally to chemically altering compounds and more specifically to controlling the emission of toxic compounds into the atmosphere using catalysis-assisted non-thermal plasma technologies.

BACKGROUND OF THE INVENTION

A primary environmental objective, is to reduce the presence of volatile organic compounds (VOCs), chlorofluorocarbons (CFCs), perfluorocarbons (PFCs), and other toxic compounds in the atmosphere. Many of these compounds are responsible for stratospheric ozone depletion and global climatic change. Decomposition of these compounds is one of the methods available to control their emission into the atmosphere. Various techniques for decomposing compounds such as VOCs have been investigated, including: catalytic oxidation, thermal decomposition, carbon adsorption, and condensation. Unfortunately, many of these techniques are effective against only a small range of toxic compounds. Furthermore, many of these techniques are not able to decompose, cost effectively, VOCs and other toxic compounds existing in low concentrations.

Non-thermal plasma techniques, however, are capable of cost effectively decomposing various toxic compounds, particularly where the contaminant concentration is low, for example less than 1,000 parts per million (ppm). Effective non-thermal plasma techniques include ferroelectric (high dielectric ceramics) packed-bed reactors and nano-second pulsed corona reactors. In general, these reactors produce non-thermal plasmas in which the electron mean energies are considerably higher than those of the components of the surrounding ambient gas. When electrical power is applied to these reactors, the majority of the electrical energy goes into the production of energetic electrons, rather than into producing ions and heating the ambient gas. Therefore, the plasma energy is directed to electron-impact dissociation and ionization of the ambient gas to produce radicals that, in turn, decompose toxic compounds entrained within the ambient gas. This is a more efficient and cost effective method of decomposing toxic compounds than conventional methods.

Unfortunately, the decomposition of toxic compounds using non-thermal plasma techniques produces unwanted reaction by-products such as carbon monoxide (CO), carbon dioxide ($CO_2$), nitric oxide (NO), nitrogen dioxide ($NO_2$), nitrous oxide ($N_2O$), ozone ($O_3$), and other VOCs. Consequently, additional devices are necessary to control these undesirable by-products, thereby increasing cost and energy consumption.

It would be desirable to decompose toxic compounds and at the same time, selectively eliminate toxic by-products produced by the reaction. Furthermore, it would be desirable to perform cost effective toxic compound decomposition without elevating the temperature and reducing pressure of the gas within which the toxic compounds are entrained.

SUMMARY OF THE INVENTION

It is therefore an object of the present invention to provide methods and apparatus for controlling undesirable by-products produced by the decomposition of toxic compounds using single-staged, catalysis-assisted non-thermal plasma techniques.

It is yet another object of the present invention to provide methods and apparatus for decomposing toxic compounds using non-thermal plasma wherein by-products of the decomposition reaction are eliminated within a single-staged reactor.

These and other objects are provided, according to one aspect of the present invention, by a method for decomposing toxic compounds with catalysis-assisted, non-thermal plasma so that by-products produced thereby are reduced, comprising the steps of: introducing a carrier gas, having a toxic compound entrained therein, through a packed-bed of ferroelectric pellets coated or impregnated with a catalyst; and polarizing the pellets to produce a plasma to decompose the toxic compound. By-products are produced by the decomposition process.

The pellets may be formed of a material selected from various high dielectric materials (relative dielectric constant greater than approximately 5) including, but not limited to, barium titanate, strontium titanate, niobium titanate, and various ceramics. The pellets are typically between about 0.5 millimeter and 5.0 millimeters. An active catalyst is selected to react with the decomposition products, and may be selected from a variety of elements and compounds including, but not limited to, oxidation catalysts using noble metals, metal oxides, and reducing catalysts. Exemplary catalysts include, but are not limited to, cobalt, copper, chromium, nickel, vanadium, platinum/aluminum oxides ($Pt/Al_2O_3$), palladium/aluminum oxides ($Pd/Al_2O_3$), rhodium, rhodium/zinc oxides ($RhZnO_2$), ferrous oxide, ferric oxide, and zeolite. Additionally, the pellets may be coated or impregnated with a plurality of catalysts.

The carrier gas comprises a gas selected from, but not limited to, air, oxygen, nitrogen, argon, and may be entrained with toxic compounds including, but not limited to, VOCs; CFCs; PFCs; halons; sulfur and nitrogen compounds; and ammonia. The carrier gas may be continuously passed through the packed-bed of pellets or a finite volume may be passed. Applications are not limited to contaminant decomposition or destruction. The present invention can be applied to hydrocarbon synthesis and polymerization with appropriate coupling catalysts and additives.

The step of polarizing the pellets comprises applying alternating current high-voltage power to generate microdischarges between the pellets. The use of a commercially available power supply (50/60 Hz frequency and standard line voltage, 90–120V) is preferable, although higher frequency (up to 20,000 Hz) power supplies may be used. Voltages and current flow will vary depending upon reactor size.

According to another aspect of the present invention, a method for decomposing toxic compounds with catalysis-assisted pulsed corona plasma so that by-products produced thereby are reduced, comprises the steps of: introducing a carrier gas, having a toxic compound entrained therein, through at least one pair of spaced apart plates, wherein each one of the plates is coated with at least one catalyst; and applying nano-second pulsed high voltage to a wire positioned between the plates to produce a plasma therebetween which decomposes the toxic compounds and produces decomposition by-products.

A plurality of pairs of plates may be utilized, each one of the pairs of plates having at least one wire positioned therebetween and, wherein each one of the plates is coated with at least one catalyst. The active catalyst is selected to react with the decomposition products, and is selected from a variety of elements and compounds including, but not limited to, oxidation catalysts using noble metals, metal oxides, and reducing catalysts. Exemplary catalysts include, but are not limited to, cobalt, copper, chromium, nickel, vanadium, platinum/aluminum oxides ($Pt/Al_2O_3$), palladium/aluminum oxides ($Pd/Al_2O_3$) rhodium, rhodium/zinc oxides ($RhZnO_2$), ferrous oxide, ferric oxide, and zeolite. More than one catalyst may be utilized.

According to another aspect of the present invention, an apparatus for decomposing toxic compounds with a catalysis-assisted ferroelectric packed-bed plasma so that by-products produced thereby are reduced, comprises: a vessel having an internal passageway configured to receive a carrier gas therethrough; a plurality of ferroelectric pellets formed as a packed-bed in the vessel, the plurality of pellets coated with at least one catalyst; and means for producing plasma within the packed-bed of pellets. The pellets may be formed of a material selected from various high dielectric materials including, but not limited to, barium titanate, strontium titanate, niobium titanate, and various ceramics. The pellets are typically between about 0.5 millimeter and about 5.0 millimeters.

An active catalyst is selected to react with the decomposition products, and is selected from a variety of elements and compounds including, but not limited to, oxidation catalysts using noble metals, metal oxides, and reducing catalysts. Exemplary catalysts include, but are not limited to, cobalt, copper, chromium, nickel, vanadium, platinum/aluminum oxides ($Pt/Al_2O_3$), palladium/aluminum oxides ($Pd/Al_2O_3$) rhodium, rhodium/zinc oxides ($RhZnO_2$), ferrous oxide, ferric oxide, and zeolite. Additionally, the pellets may be coated with a plurality of catalysts.

The apparatus may further comprise a carrier gas flow channel in fluid communication with the vessel internal passageway configured to cause a carrier gas entrained with toxic compounds to flow through the packed-bed of ferroelectric pellets.

Means for producing a non-thermal plasma comprises a pair of spaced apart electrodes positioned within the vessel, wherein the packed-bed of pellets is positioned between the electrodes. Each one of the electrodes may be formed of conductive screen. Each one of the electrodes has a generally transverse orientation to the direction of flow of a carrier gas through the internal passageway. Each one of the electrodes may have an orientation generally parallel to the direction of flow of a carrier gas through the internal passageway. Alternatively, means for producing an active plasma may comprise a pair of generally tubular spaced apart electrodes, each one of the electrodes having a longitudinal axis generally parallel with the direction of flow of a carrier gas through the internal passageway, wherein the packed-bed of pellets is positioned between the electrodes.

According to another aspect of the present invention, an apparatus for decomposing toxic compounds with catalysis-assisted pulsed corona plasma technology so that by-products produced thereby are reduced, comprises: a vessel having a tubular housing defining an internal passageway configured to receive a carrier gas therethrough, and wherein the passageway is coated with at least one catalyst; a corona wire extending through the internal passageway in a direction generally parallel with the longitudinal axis of the internal passageway; and means for applying pulsed high voltage to the corona wire to produce a plasma within the internal passageway. The apparatus may further comprise a carrier gas flow channel in fluid communication with the vessel internal passageway and configured to cause a carrier gas entrained with toxic compounds to flow therethrough.

The tubular housing is grounded and may be formed and constructed of any conductive material. The passageway is coated with at least one catalyst selected from a variety of elements and compounds including, but not limited to, oxidation catalysts using noble metals, metal oxides, and reducing catalysts. Exemplary catalysts include, but are not limited to, cobalt, copper, chromium, nickel, vanadium, platinum/aluminum oxides ($Pt/Al_2O_3$), palladium/aluminum oxides ($Pd/Al_2O_3$), rhodium, rhodium/zinc oxides ($RhZnO_2$), ferrous oxide, ferric oxide, and zeolite. The passageway may be coated with a plurality of catalysts.

According to another aspect of the present invention, an apparatus for decomposing toxic compounds with a catalysis-assisted pulsed corona plasma, so that by-products produced thereby are reduced, comprises: at least one pair of spaced apart plates, wherein the plates are coated with at least one catalyst; at least one corona wire extending between each one of the pairs of spaced apart plates; and means for applying pulsed high voltage to the corona wire to produce a plasma between each one of the pairs of plates. The apparatus may further comprise a carrier gas flow channel in fluid communication with each one of the pairs of plates configured to cause a carrier gas entrained with toxic compounds to flow therethrough. Each one of the plates is formed of conductive material and coated with at least one catalyst selected from a variety of elements and compounds including, but not limited to, oxidation catalysts using noble metals, metal oxides, and reducing catalysts. Exemplary catalysts include, but are not limited to, cobalt, copper, chromium, nickel, vanadium, platinum/aluminum oxides ($Pt/Al_2O_3$), palladium/aluminum oxides ($Pd/Al_2O_3$), rhodium, rhodium/zinc oxides ($RhZnO_2$), ferrous oxide, ferric oxide, and zeolite. Each one of the plates may be coated with a dielectric material in addition to at least one catalyst. The plates are typically grounded.

The present invention is advantageous for a number of reasons. The by-products produced during the decomposition of toxic compounds can be eliminated within the same reactor utilized to decompose the toxic compounds. No additional devices or treatment steps are required. The non-thermal plasma techniques employed by the present invention have several advantages: first of all, both non-thermal plasma reactors described herein can operate under ambient temperature and pressure; the techniques are energy efficient and inexpensive; and commercially available power supplies may be used. The pellets require little maintenance and are resistive to poisoning. No additional disposal is required and by-products can be tuned by adjusting the power to match source flow and concentration. Effective decomposition of toxic compounds can be obtained in a wide range of carrier gases, concentration gradient, and performance is not degraded due to the presence of halogens or other gaseous compounds.

The present invention can be readily added to existing systems, and used for a wide range of applications, including continuous flow systems. Potential applications for the present invention include: decomposing toxic compounds generated by the semiconductor industry; controlling odors and biocontamination in the agricultural, food, medical, and pharmaceutical industries; $NO_x$, particulate and soot control from the automobile industry; controlling viruses and bacteria in medical applications; controlling toxic compounds generated by restaurants, bakeries, dry cleaners, and combustion processes; and solvents generated from paint and chemical industries. In addition, the present invention can be applied to hydrocarbon synthesis and polymerization with appropriate coupling catalysts, for example, lithium/magnesium oxide (Li/MgO) and lanthanum oxide ($La_2O_3$), and additives.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout.

Packed-bed plasma technology is discussed in U.S. Pat. No. 5,236,672 to Nunez et al., and in U.S. Pat. No. 4,954,320 to Birmingham et al., each of which is incorporated herein by reference in its entirety. In general terms, non-thermal plasma reactors include ferroelectric packed-bed plasma reactors, and pulsed corona plasma reactors. As is known by those having skill in the art, both types of reactors produce a plasma which reacts with and decomposes various chemical compounds entrained within a carrier gas flowing through the reactor. In a ferroelectric packed-bed reactor, an active plasma is generated by polarizing each pellet within the packed-bed. The resulting electric field on the surface of each polarized pellet generates microdischarges between the pellets to generate radicals and excited atomic and molecular species that initiate chemical reactions leading to decomposition.

A pulsed corona plasma reactor, generally comprises a grounded tube having a wire running therethrough, to which is applied pulsed high voltage. See, for example, U.S. Pat. Nos. 4,541,848 and 4,665,476 to Masuda, which are incorporated herein by reference, in their entirety. The pulsed corona reactor employs a positive DC power supply that typically is altered to produce a short pulse (nanosecond order pulse) with an extremely fast rise time through a rotating spark gap. A sharp-rise pulsed corona produces a streamer corona, which has the advantage of generating free electrons while producing a limited number of ions. Electrons can be intensely accelerated to high energy levels to form plasmas without raising the ion and gas temperature in such a short pulse field.

Figure 1A:
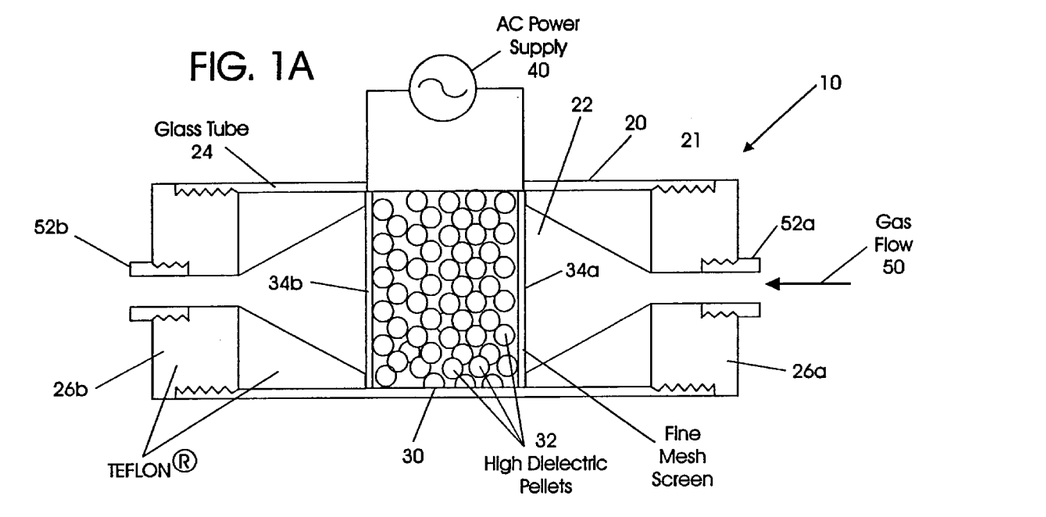
FIG. 1A is a schematic illustration of a ferroelectric packed-bed plasma reactor according to one embodiment of the present invention.

Referring now to FIG. 1, a catalysis-assisted packed-bed plasma reactor system 10, according to one embodiment of the present invention is schematically illustrated. The reactor system 10 comprises a tubular reactor 20 packed with a pellet layer 30, alternating current (AC) high-voltage power supply 40, and carrier gas flow means 50. The pellet layer 30 is preferably comprised of a plurality of ferroelectric pellets 32. The dielectric constant $\epsilon$ of each one of the pellets 32 is preferably between about 5 and 15,000. The pellets 32 are preferably formed of piezoelectric materials such as barium titanate ($BaTiO_3$), strontium titanate ($SrTiO_3$), or niobium titanate ($NbTiO_3$); however, other acceptable dielectric materials such as aluminum oxides ($Al_2O_3$) having a sufficient dielectric constant may be used. Preferably, the pellets 32 have a generally spherical shape, although other shapes may be acceptable. Non-spherical shapes are generally to be avoided because adequate polarization may be difficult to achieve. The preferred diameter of the pellets is about 1.0 millimeter (mm); however, pellets having a diameter of between about 0.5 mm and about 5.0 mm may be acceptable. As will be described in greater detail below, the ferroelectric pellets 32 are coated, or impregnated, or mixed with at least one active catalyst. Alternatively, catalyst pellets may be coated with ferroelectric powders.

Still referring to the embodiment illustrated in FIG. 1, the pellets 32 are held within the tubular reactor 20 by a pair of spaced apart electrodes 34a,34b. Each one of the electrodes 34a,34b are electrically connected to the AC high-voltage power supply 40. The distance between the spaced apart electrodes 34a,34b is a function of the electrical power supplied via power supply 40. Because it is desirable to use a commercial power supply, the maximum separation of each electrode 34a,34b is about 1 inch considering the maximum achievable electric field from a power supply rated at 20 kv. However, this distance may be increased or decreased as desirable by changing the power supply accordingly.

Figure 1B:
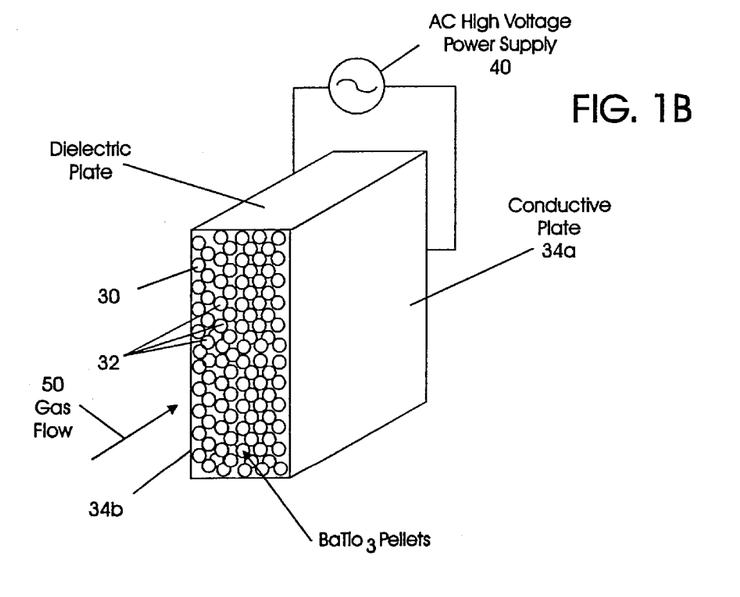
FIG. 1B is a schematic illustration of ferroelectric packed-bed plasma reactor wherein the electrodes are generally parallel with the flow of gas.

In the illustrated embodiment, the spaced apart electrodes 34a,34b are configured in a generally parallel orientation with respect to each other, and are generally transverse to the flow of a carrier gas through the reactor 20. In an alternative configuration, the pair of spaced apart electrodes 34a,34b may be oriented generally parallel with the flow of gas through the reactor 20. Additionally, there may be more than one pair of electrodes, each pair having a plurality of pellets 32 contained therewithin. Each pair of electrodes may be configured the same or may be configured differently, with respect to each other. For example, one pair of electrodes may be oriented generally parallel with the flow of gas through the reactor 20, and another pair of electrodes may be generally transverse to the flow of gas through the reactor (FIG. 1B).

Preferably, each one of the electrodes 34a,34b are fine mesh screens formed from a conductive material such as stainless steel or tungsten, and depending upon the gas treated. However, as those having skill in the art would understand, other conductive materials may be used. Alternatively, each one of the electrodes 34a,34b may be a conductive plate having a plurality of perforations therein to permit the gas to flow therethrough. In the embodiments comprising electrodes having a generally parallel configuration with respect to the flow of a gas through the reactor, the electrodes 34a,34b may be conductive plates without any perforations therein.

In the illustrated embodiment, the tubular reactor 20 comprises an inner body portion 21 having an internal carrier gas passageway 22 therethrough, and is surrounded by an outer tube 24. In operation, a carrier gas enters the reactor 20 through entry point 52a in end portion 26a and leaves the reactor through exit point 52b in end portion 26b. The internal carrier gas passageway 22 preferably diverges towards the location of the pellet layer 30. The carrier gas passageway 22 preferably converges from the pellet layer 30. As would be understood by those having skill in the art, various materials and configurations of the tubular reactor may be acceptable. Furthermore, the reactor 20 and all components may have any size and configuration desirable. The reactor 20 is not limited, except for practical considerations, with respect to either length or diameter. Exemplary reactors are described in U.S. Pat. No. 4,954,320 to Birmingham et al., and U.S. Pat. No. 5,236,672 to Nunez et al.

Still referring to FIG. 1, when a carrier gas having a chemical compound entrained therein is passed through the reactor 20, high-voltage AC power is applied to the electrodes 34a,34b by the power supply 40. Acceptable frequencies of alternating current are line frequencies of about 50/60 Hz. However, frequencies from about 1 Hz to about 20,000 Hz may also be utilized. The applied voltage may be single phase or polyphase, and is preferably standard line voltage of between about 90 volts and about 240 volts. The applied electric field causes the pellets 32 to become polarized, and to form an intense electric field around each pellet and in the interstitial spaces between the pellets wherein a plurality of microdischarges (plasma) are formed. These microdischarges start with disassociation of oxygen, nitrogen and moisture via electron impact processes. The oxygen, nitrogen, and hydroxyl radicals react with VOC radicals which leads to the decomposition of toxic compounds entrained by homolysis reaction within the carrier gas.

Preferable carrier gases include, but are not limited to: air, oxygen, argon, and helium. The reactor size is dependent on the desired volumetric flow rate, the carrier gas composition, the toxic compound entrained within the carrier gas, and the concentration of the toxic compound within the carrier gas. For example, toluene is relatively easy to decompose and requires less residence time within a reactor, than many other VOCs. Consequently, the flow rate of a carrier gas entrained with toluene may be larger than that for a carrier gas entrained with another VOC.

Figure 2:
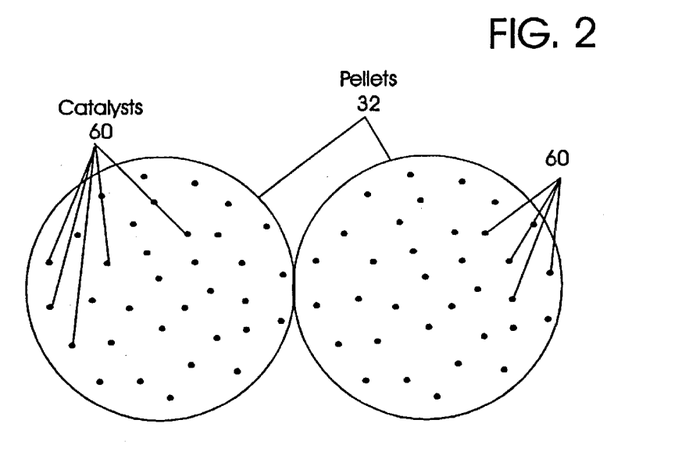
FIG. 2 illustrates the coating of a dielectric pellet with a catalyst.

Referring now to FIG. 2, the catalysts will be described in greater detail. All of the ferroelectric pellets 32, or a substantial number of the pellets, are coated with at least one catalyst 60. Less than all of the pellets 32 may be coated with a catalyst as long as a sufficient number are coated to react effectively with the decomposition by-products. Typically, the total catalyst coating, per pellet, covers about one percent (1%) of the surface area of each pellet. However, a catalyst 60 may coat up to the entire surface area (100%) of a pellet, depending on the desired chemical reactions. Because the ability to polarize each pellet diminishes as the percentage of the coated surface increases, it is typically not desirable to coat the entire surface area of a pellet. All of the pellets 32, or a substantial number of the pellets, may be coated with more than one catalyst 60. Less than all of the pellets 32 may be coated with more than one catalyst as long as a sufficient number are coated to react effectively with the decomposition byproducts. Each catalyst coating may cover between about 1% and about 100% of the surface area of each pellet.

Preferred catalysts include, but are not limited to, oxidation catalysts using noble metals, metal oxides, and reducing catalysts. Exemplary catalysts include, but are not limited to, cobalt, copper, chromium, nickel, vanadium, platinum/aluminum oxides ($Pt/Al_2O_3$), palladium/aluminum oxides ($Al_2O_3$), rhodium, rhodium/zinc oxides ($RhZnO_2$), ferrous oxide, ferric oxide, and zeolite. Additionally, the pellets may be coated with a plurality of catalysts. An exemplary method of coating a pellet with a catalyst comprises the following steps: impregnating a $BaTiO_3$ pellet with a metal salt solution, for example $Cr(NO_3)_3$; drying the pellet in a rotary evaporator at 50° C.; calcinating in air at 500° C. for four hours; and reducing under hydrogen at 400° C. for two hours. However, as those having skill in the art would understand, other methods for coating ferroelectric pellets with catalysts may be utilized.

Figure 3A:
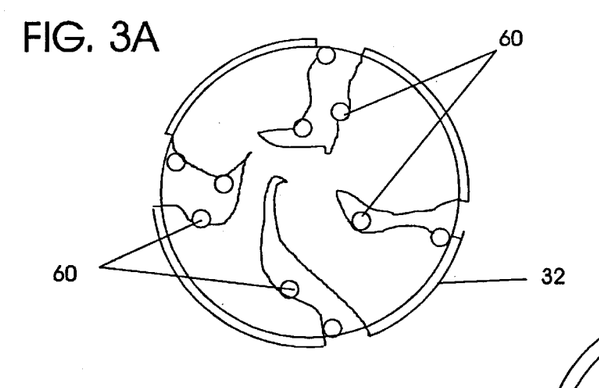
FIG. 3A illustrates a porous dielectric pellet having active catalysts impregnated on the surface.
Figure 3B:
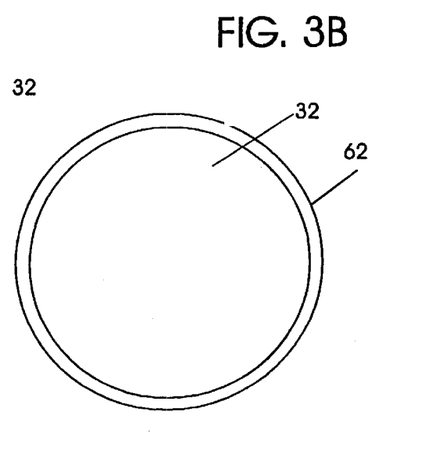
FIG. 3B illustrates a catalyst pellet coated with ferroelectric powders.
Figure 3C:
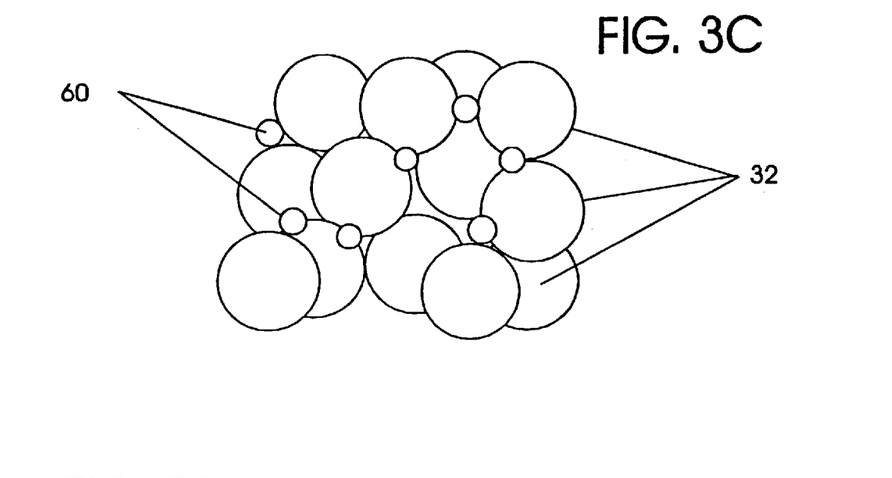
FIG. 3C illustrates the mixture of dielectric pellets and catalysts.

Referring now to FIGS. 3A, 3B, 3C, alternative active catalyst coating techniques are illustrated. As shown in FIG. 3A, each pellet 32 may be formed of a porous dielectric material, wherein the surface of the pellet contains a plurality of crevices and other surface indentations. Catalysts 60 may be applied such that the coating adheres within these surface indentations and crevices. As shown in FIG. 3B, pellets 32 may be formed from catalyst pellets and then coated with a dielectric material such as $BaTiO_3$ powder 62. It is preferable that a porous dielectric coating is used to permit a carrier gas to penetrate and react with the active catalyst pellet. As shown in FIG. 3C, the pellets 32 may be mixed with one or more catalysts 60 without coating the surfaces of the pellet. The catalysts 60 may comprise pellets of generally smaller size than the pellets 32. The catalysts 60 may also be in the form of a powder.

In operation, the catalysts, which are either adhered to the pellets, coated ferroelectric pellets or mixed therewith, react with the various by-products of the plasma reaction between the plasma and the toxic compound entrained within the carrier gas to produce various non-toxic compounds. These reactions depend upon the catalysts utilized and the by-products produced by the decomposition reaction. Exemplary reactions include the conversion of CO to $CO_2$ by oxidation. Especially effective catalysts include Ni and Cr, as shown in the experimental results below.

Figure 4:
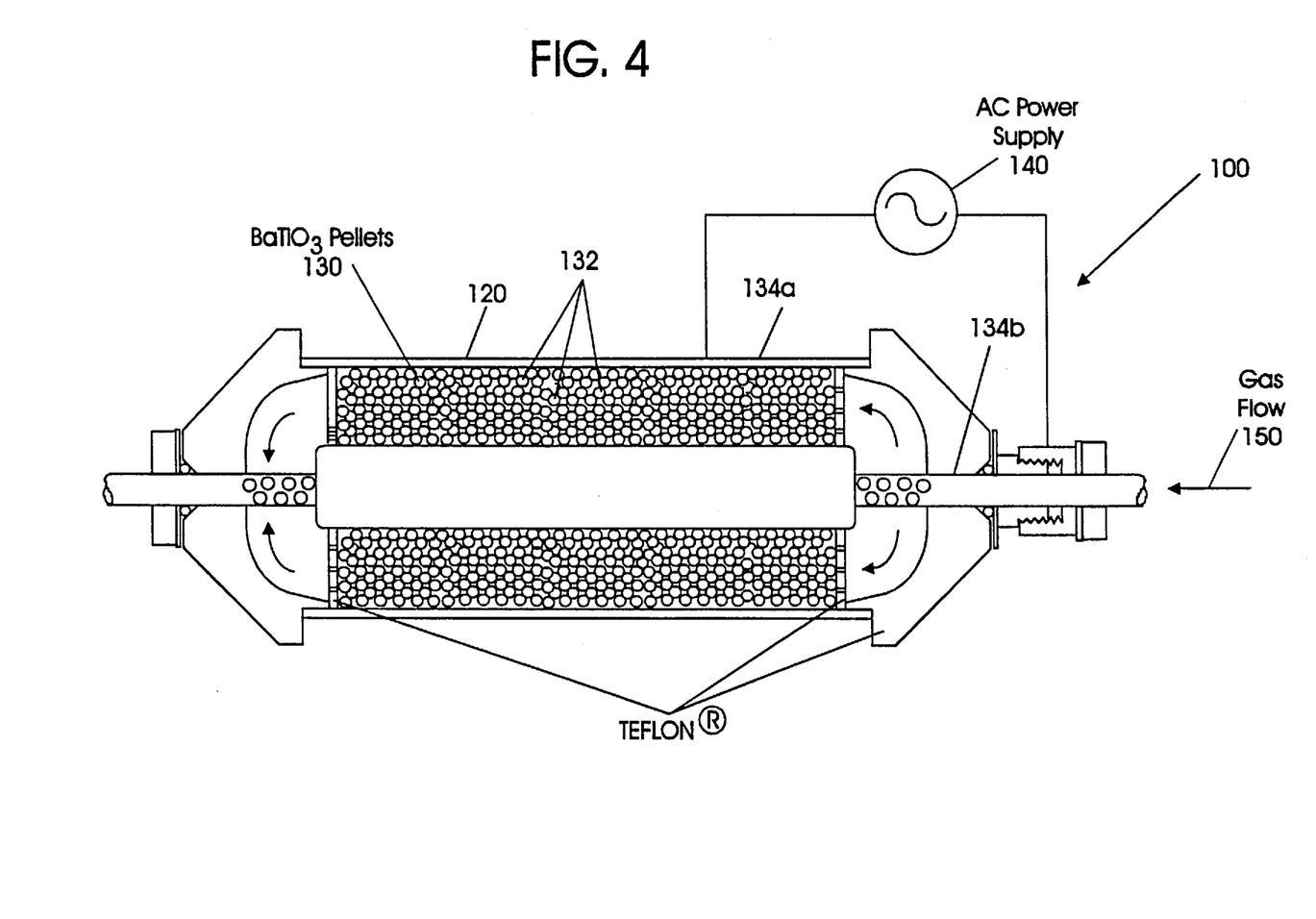
FIG. 4 is a schematic illustration of an alternative embodiment of a ferroelectric packed-bed plasma reactor according to the present invention.

Referring now to FIG. 4, a catalysis-assisted packed-bed plasma reactor system 100, according to another embodiment of the present invention is schematically illustrated. The reactor system 100 comprises a coaxial reactor 120 packed with a ferroelectric pellet layer 130, AC high-voltage power supply 140, and gas flow means 150. The pellet layer 130 is comprised of a plurality of ferroelectric pellets 132 positioned between two concentric electrodes 134a,134b. The concentric electrode configuration facilitates longer residence times and high gas volumes. The AC power supply 140 applies electrical current to the electrodes 134a,134b in the radial direction.

Figure 5A:
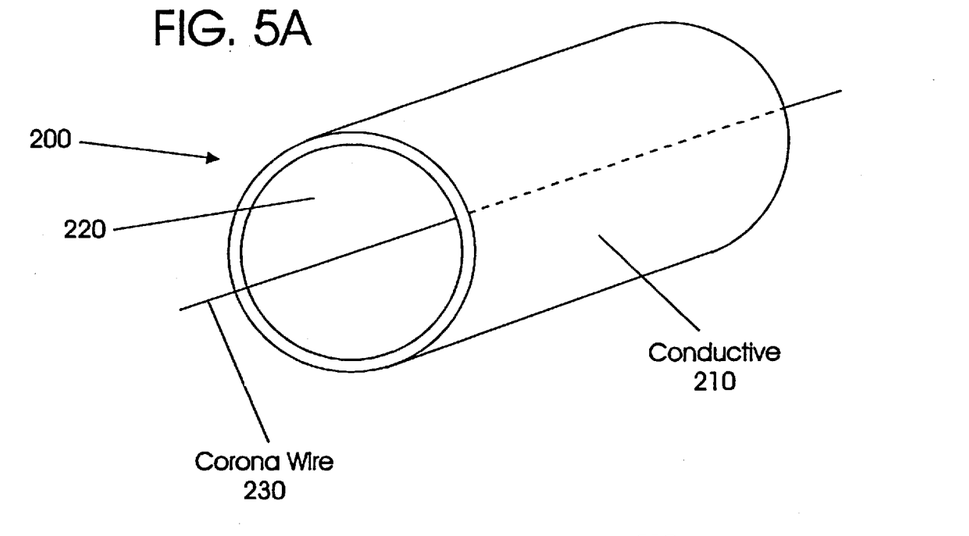
FIG. 5A–5E are schematic illustrations of various embodiments of a catalysis-assisted pulsed corona plasma reactor according to the present invention.
Figure 5B:
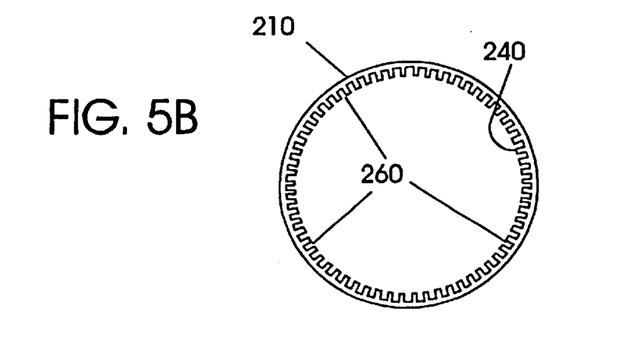

Referring now to FIGS. 5A–5E, a catalysis-assisted pulsed corona plasma reactor 200, according to various embodiments of the present invention, is schematically illustrated. In one embodiment, the reactor 200 comprises a tubular grounded electrode 210 defining an internal passageway 220 configured to receive a carrier gas therethrough, and a corona wire 230 in the center extending through the passageway in a direction generally parallel with the longitudinal axis of the tubular electrode (FIG. 5A). The interior surface 240 of the tubular electrode 210 is coated with at least one catalyst 260 (FIG. 5B). In operation, nano-second pulsed high voltage is applied to the corona wire 230 to produce a plasma in the passageway 220 through which a carrier gas passes. The tubular electrode 210 is grounded.

Figure 5C:
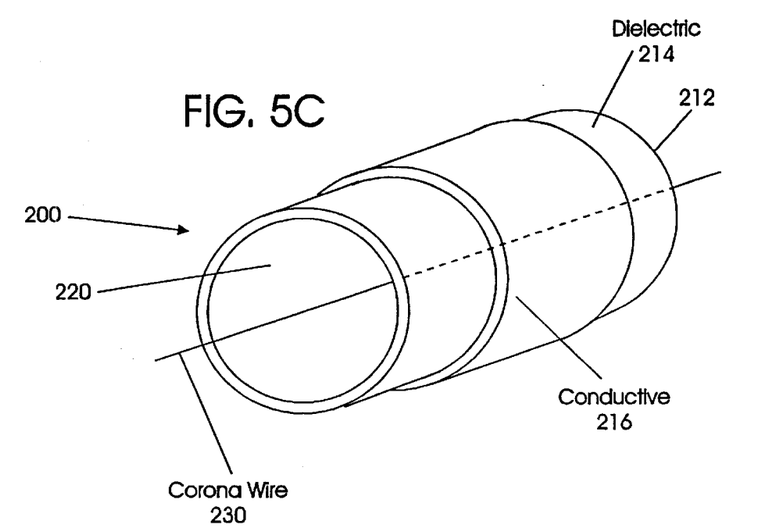
Figure 5D:
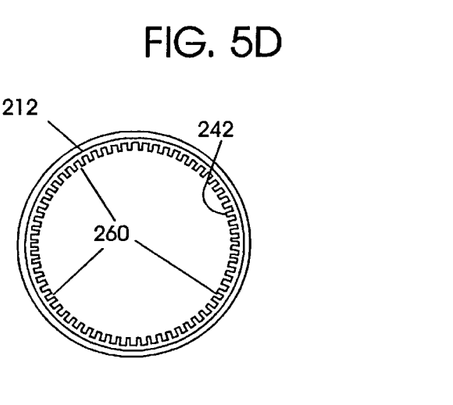

In an another embodiment, the reactor 200 may comprise a tubular member 212 formed of a dielectric material and defining an internal passageway 220 configured to receive a carrier gas therethrough, and a corona wire 230 in the center extending through the passageway in a direction generally parallel with the longitudinal axis of the tubular member (FIG. 5C). Surrounding the outer surface 214 of the tubular member 212 is a grounded tubular electrode 216. The interior surface 242 of the tubular member 212 is coated or impregnated with at least one active catalyst 260 (FIG. 5D).

Figure 5E:
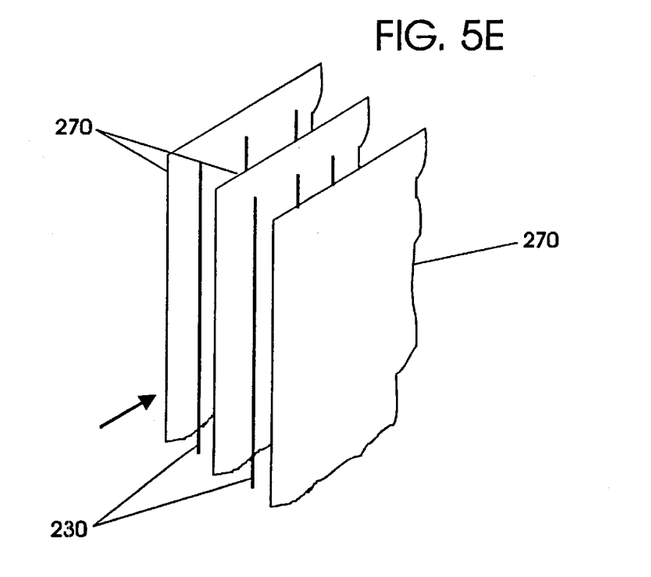

In yet another embodiment, the reactor 200 may comprise at least one pair of spaced apart plates 270 configured to receive a carrier gas therethrough, and at least one corona wire 230 extending between each one of the pairs of spaced apart grounded plates (FIG. 5E). Each one of the spaced apart grounded plates 270 is coated with at least one catalyst (not shown). The grounded plates 270 may be coated with dielectric material which is then coated or impregnated with at least one active catalyst. In operation, nano-second pulsed high voltage is applied to each corona wire 230 to produce plasma between the spaced apart plates 270. The plates 270 are grounded. This configuration is particularly well-suited for industrial applications requiring the treatment of a large gas volume.

EXPERIMENTAL RESULTS

A series of experiments were performed on a catalysis-assisted packed-bed reactor, similar to the reactor illustrated in FIG. 1. The configuration employed a unique single-stage process in which the $BaTiO_3$ pellets were coated by a variety of active catalysts Special attention was focused on the enhancement of the $CCl_4$ destruction as well as the by-products.

Liquid carbon tetrachloride ($CCl_4$) placed in a glass container was immersed in an ethylene glycol bath in which the bath temperature was thermostatically controlled at $-9°$ C. to obtain the desired vapor pressure. The $CCl_4$ vapor was mixed with zero air that consisted of 79% nitrogen, 21% oxygen, and only trace impurities. To obtain the desired concentration and the flow rate, the $CCl_4$ and zero air streams flow rate were controlled by independent flow control valves. Humidification of the gas stream was produced by bubbling the zero air though water in a standard bubbler prior to combining with the $CCl_4$ streams. The gas stream then entered the packed-bed plasma reactor.

Unreacted $CCl_4$ and products of CO and $CO_2$ were analyzed by two gas chromatographs (GCs) equipped with a flame ionization detector (FID). The amount of unreacted $CCl_4$ was determined by a FID GC with a 2 meter long stainless steel separation column (3 mm inside diameter) packed with Chromosorb-102 heated at 180° C. CO was separated with a 1 meter long molecular sieve 5A column, and $CO_2$ was separated with a 1 meter long silica gel column; both operated at 90° C. CO and $CO_2$ eluted from the columns were converted to $CH_4$ in a hydrogen stream and detected by a FID. Sample gas of 1 milliliter (mL) was taken from the effluent by a syringe and injected into the GC. The concentrations were determined by computing the area under the $CCl_4$ peaks in relation to that of the certified gas.

A ferroelectric packed-bed reactor employed an AC power supply at either 50 Hz or 18 kHz in conjunction with a tubular reactor packed with a ferroelectric (high-dielectric ceramic) pellet layer, similar to the reactor illustrated in FIG. 1. The $BaTiO_3$ or $SrTiO_3$ pellets, 1 mm to 3 mm in diameter, were held within the tube arrangement by two metal mesh electrodes (2.5 cm separation) connected to the high-voltage AC power supply.

$BaTiO_3$ pellets were coated by several active catalysts in a configuration similar to that illustrated in FIG. 2. When external AC voltage was applied across the ferroelectric pellet layer, the pellets were polarized, and an intense electric field was formed around each pellet contact point, resulting in partial discharge. Especially when the 18 kHz transformer was used, local heating occurred near the contact point where the electron and ion bombardment and electron temperature were excessively high.

Experiments were performed to evaluate the feasibility of the catalysis-assisted plasma reactor. The flow rate was set at approximately 200 mL/min which corresponds to a residence time of 1.3 seconds. The $CCl_4$ concentration was set between 450 and 560 ppm. The power level was set at 11.7 kV for the 50 Hz neon transformer and 4.2 kv for the 18 kHz transformer. Humidification of the gas stream, when used, was maintained at 1,500 ppm.

Initially, the $CCl_4$, concentration was measured at the reactor inlet, the reactor outlet, and the GC inlet. The concentrations at the three locations were almost identical, confirming that there were no losses of $CCl_4$ in the reactor, pellet material or tubing. A carbon balance was performed for each of the experiments. The results showed a reasonable carbon closure (within 15%), indicating no major hydrocarbons produced in the reaction pathway.

The selection of the catalyst emphasized minimizing the CO generated during the plasma chemical process. Catalysts such as cobalt (Co), copper (Cu), chromium (Cr), nickel (Ni), and vanadium (V) were coated on the 1 mm diameter $BaTiO_3$ pellets. However, only 0.5% to 1.0% of the catalyst was actually coated on the $BaTiO_3$ pellets because the pellets had low porosity.

Figure 6:
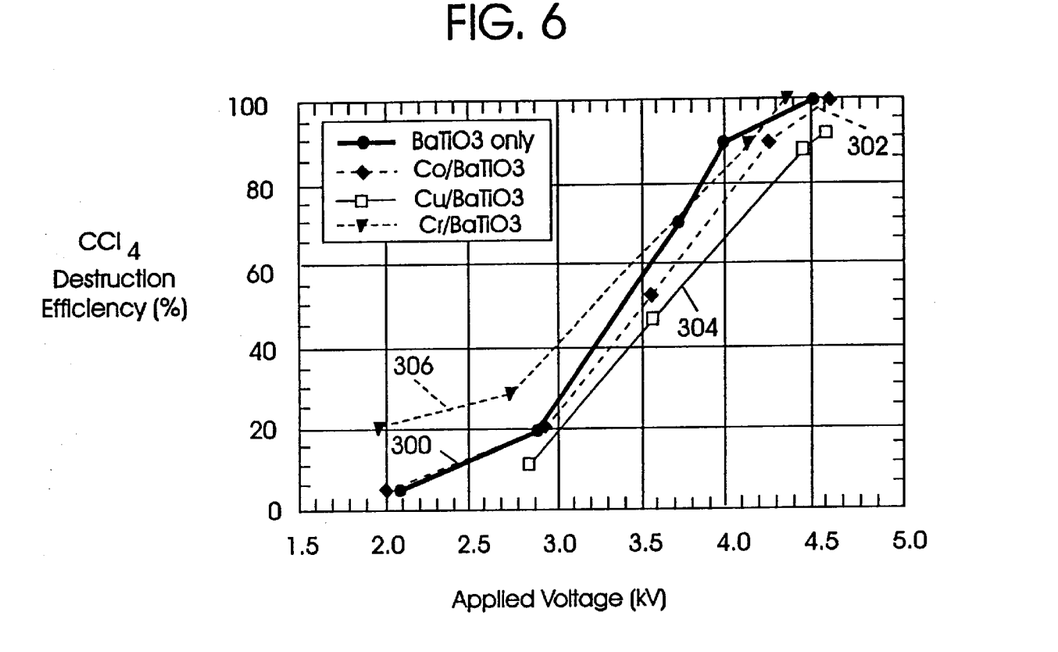
FIG. 6 is a graphical representation of carbon tetrachloride destruction efficiency using catalysis-assisted packed-bed plasma technology with cobalt, copper, and chromium catalysts.

FIG. 6 illustrates the voltage-dependent $CCl_4$ destruction efficiency when the 18 kHz transformer was used with Co, Cu, and Cr catalysts. $CCl_4$ destruction efficiency, by percentage, is plotted along the y-axis. The applied voltage, in kilovolts (kV), is plotted along the x-axis. The destruction efficiency for $BaTiO_3$ pellets without catalyst is shown as the baseline data 300. Also plotted in FIG. 6 are: the destruction efficiency for $BaTiO_3$ pellets with cobalt catalyst 302; the destruction efficiency for $BaTiO_3$ pellets with copper catalyst 304; and the destruction efficiency for $BaTiO_3$ pellets with chromium catalyst 306.

Figure 7:
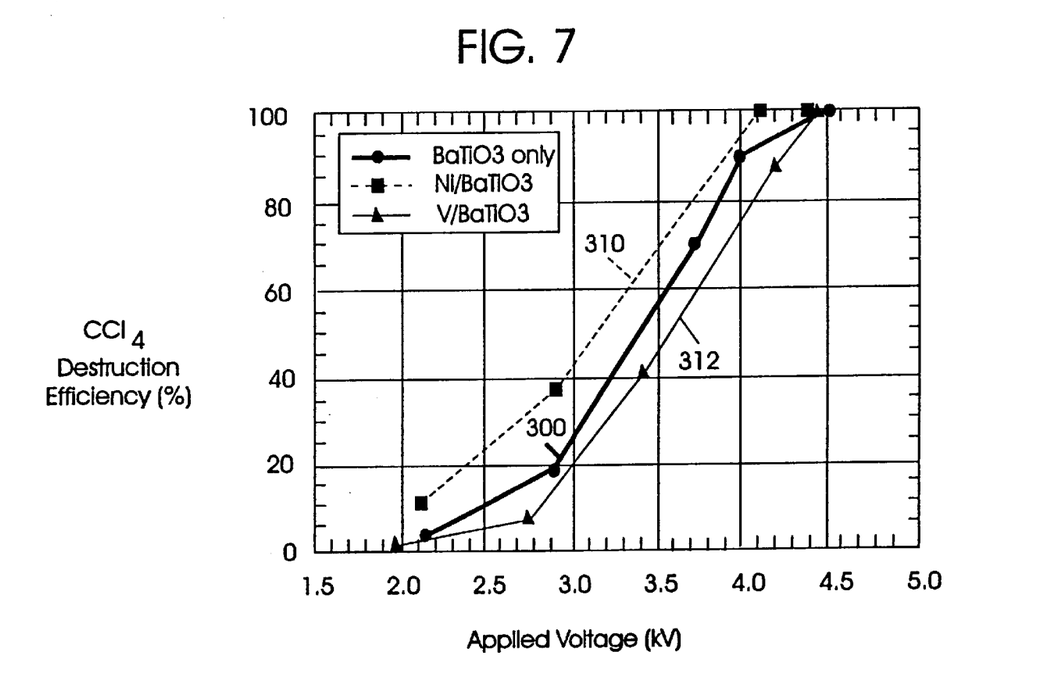
FIG. 7 is a graphical representation of carbon tetrachloride destruction efficiency using catalysis-assisted packed-bed plasma technology with nickel and vanadium catalysts.

FIG. 7 illustrates the voltage-dependent $CCl_4$ destruction efficiency when the 18 kHz transformer was used with Ni and V catalysts. $CCl_4$ destruction efficiency, by percentage, is plotted along the y-axis. The applied voltage, in kilovolts (kV), is plotted along the x-axis. The destruction efficiency for $BaTiO_3$ pellets without catalyst is shown as the baseline data 300. Also plotted in FIG. 7 are: the destruction efficiency for $BaTiO_3$ pellets with nickel catalyst 310; and the destruction efficiency for $BaTiO_3$ pellets with vanadium catalyst 312.

The Cu and V catalysts show a slight reduction in $CCl_4$ destruction efficiency over the entire range of voltage. CO concentration (not shown) was reduced to 13% for Cu and 35% for V catalysts compared with CO concentration using BaTiO$_3$ pellets without catalyst. The use of Co catalyst shows almost identical CCl$_4$ destruction as with BaTio$_3$ alone, but CO concentration was reduced to 24%. The use of Cr catalyst performed much better at lower operating voltages and 27% of CO concentration was measured. The best CCl$_4$ destruction was achieved with the Ni catalyst and, at the same time, CO concentration was reduced to 60%.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for decomposing volatile organic compounds in a single stage with a catalysis-assisted non-thermal plasma to reduce produced decomposition byproducts therefrom, said method comprising the steps of:

introducing a carrier gas, having at least one volatile organic compound entrained therein, into a packed-bed of ferroelectric pellets, wherein said pellets are coated with an active catalyst; and polarizing the pellets to produce a non-thermal plasma around the pellets to decompose the at least one volatile organic compound and produce decomposition by-products therefrom, with said catalyst selected to react with said decomposition by-products.

2. A method according to claim 1, wherein said step of polarizing the pellets, comprises applying across the packed bed alternating current voltage power to generate microdischarges between the pellets.

3. A method according to claim 1, wherein a substantial number of the pellets are coated with a plurality of catalysts.

4. A method according to claim 1, wherein said introducing step is carried out by continuously passing the carrier gas, having the at least one volatile organic compound entrained therein, into the packed-bed of ferroelectric pellets.

5. A method according to claim 1, wherein the pellets are between about 0.5 millimeter and 5.0 millimeters.

6. A method for decomposing volatile organic compounds in a single stage with a catalysis-assisted plasma to reduce produced decomposition by-products therefrom, said method comprising the steps of:

introducing a carrier gas, having at least one volatile organic compound entrained therein, into a packed-bed of ferroelectric barium titanate pellets, wherein said pellets are coated with an active catalyst; and applying across the packed bed alternating current voltage power sufficient to polarize the pellets and produce a plasma which decomposes the at least one volatile organic compound and produces decomposition by-products therefrom, said active catalyst selected to react with said decomposition by-products.

7. A method according to claim 6, wherein a substantial number of the pellets are coated with a plurality of catalysts.

8. A method according to claim 6, wherein the pellets are between about 0.5 millimeter and 5.0 millimeter.

9. A method according to claim 6, wherein said introducing step is carried out by continuously passing the carrier gas, having the at least one volatile organic compound entrained therein, into the packed-bed of ferroelectric pellets.

* * * * *